2,863,852

EPOXY RESINS CURED WITH MIXTURES OF POLYCARBOXYLIC ACID ANHYDRIDES

Ridgley G. Shepherd, Jr., Weston, and Elizabeth C. Dearborn, Boston, Mass., assignors to United States Testing Company, Inc., Hoboken, N. J., a corporation of New York No Drawing. Application June 8, 1954
Serial No. 435,356

6 Claims. (Cl. 260—47)

This invention relates to resins. It is directed particularly to epoxy resins; and more especially to enhancing the resistance of such resins to the effects of heat distortion.

Epoxy resins are resins manufactured from glycidyl ethers of polyhydric compounds. They may be cured by the action of various di- or poly-carboxylic acid anhydrides, as for example, phthalic anhydride, maleic anhydride, etc., and also by various amines.

Although the epoxy resins heretofore known have many excellent properties they lack, however, that resistance to heat distortion which would increase the scope of their usefulness. For example, a resin made from a glycidyl ether of Bisphenol-A [2,2-bis(4'-hydroxyphenyl) propane] such as Epon 834 (a product of the Shell Chemical Corp.) by curing the glycidyl ether with phthalic anhydride, exhibits heat distortion under a stress of 1,500 pounds per square inch at a temperature of 113° C.

The structure of a typical epoxide, such as a glycidyl ether derived from epichlorohydrin and Bisphenol-A, is as follows:

FORMULA I

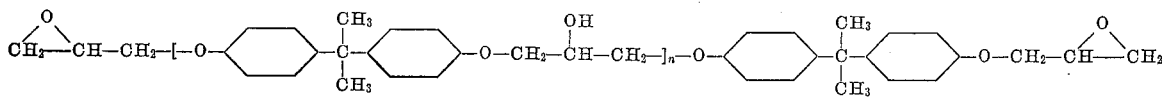

The foregoing structural formula indicates that such epoxides polymerize to some extent during synthesis; and the degree of the condensation is represented by the symbol "$n$."

In seeking to find means for markedly improving the resistance to heat distortion of epoxy resins by the curing thereof with a di-carboxylic acid anhydride, we discovered that it was possible to accomplish that objective by incorporating an agent, in small amounts, as part of the curing material which would produce a cured resin having the properties we sought.

Accordingly, it is among the principal objects of this invention to provide a novel epoxy resin that is characterized by improved resistance to heat distortion.

Another object of this invention is to provide the art with a novel means for curing a condensation polymer of the class designated by the foregoing structural Formula I, as well as related materials, so that the heat distortion characteristics thereof are markedly enhanced.

The foregoing objects and advantages, which will become apparent from the more detailed description of the invention hereinafter to be set forth, are achieved in their fundamental aspects by the employment of small amounts of dianhydrides of tetracarboxylic acids.

The following examples are illustrative of the novel curing agent and cured resins made in accordance with this invention; and also of the preparation of materials used in accomplishing such results.

*Example 1.* — *1,2,3,4,5,6,6a,7,8,9,10,11,12,12a-tetradecahydrochrysene-5,6,11,12-tetracarboxylic acid dianhydride*

This product was prepared by a Diels-Alder reaction between maleic anhydride and bis(1-cyclohexenyl) acetylene. The later compound was made by dehydrating bis(1-hydroxy-cyclohexyl)acetylene with p-toluenesulfonic acid.

98 grams (0.44 mol) of bis(1-hydroxycyclohexyl)-acetylene and 1.46 grams of p-toluenesulfonic acid monohydrate (1.5 percent on the weight of the diol) were placed in a 300 ml. flask equipped with Claisen head and a condenser and were heated to 135° C. during one hour. The bulk of the water distilled off, as formed, at atmospheric pressure; remaining water was removed at a flask temperature of 135° C. and a pressure (mercury gauge) of 80 mm. The product, bis(1-cyclohexenyl)acetylene, was then distilled from the reaction mixture at 1 mm. pressure (mercury gauge), dried over calcium sulfate, and used without further purification. The product (A) was a clear yellow liquid boiling at 129–133° C. at 1 mm. pressure (mercury gauge). The yield was 50 grams, 61 percent of theoretical.

50.2 grams (0.27 mol) of product A, bis(1-cyclohexenyl)acetylene, and 105.8 grams (1.08 mols) of maleic anhydride, together with 101 ml. of dry xylene were placed in a 500 ml. flask equipped with a spiral condenser plugged at the top with a cork containing two tubes, one to serve as a vent and one for the introduction of carbon dioxide. The mixture was refluxed under a steady stream of carbon dioxide at a flask temperature of 145–148° C. for two hours and then allowed to stand overnight. The resulting mass of crystals was heated to 45° C. to dissolve excess maleic anhydride. The product, 1,2,3,4,5,6,6a,7,8,9,10,11,12,12a-tetradecahydrochrysene-5,6,11,12-tetracarboxylic acid dianhydride, was separated from this solution by filtration, at 45° C., on a Buchner funnel, then washed with three 150-ml. portions of xylene, the crystals being allowed to stand overnight in the xylene for the first washing and for 30 minutes in the cases of the other washings, before filtration. After drying at 110° C. the product, the dianhydride having the above formula, was obtained as a white crystalline solid melting, with partial decomposition, at 235–241° C. (uncorrected). The yield was 28.5 grams, 28 percent of theoretical.

*Example 2.—Cured resin made with Example 1*

5.9 parts by weight of 1,2,3,4,5,6,6a,7,8,9,10,11,12,12a-tetradecahydrochrysene-5,6,11,12-tetracarboxylic acid dianhydride, the product of Example 1, were dissolved in 29.1 parts by weight of phthalic anhydride at 180° C. The molten solution of the dianhydride was added with stirring to 65.0 parts by weight of Epon 834, an epoxy compound of structural Formula I, supra, characterized by an average epoxide content of 0.36 epoxide group per 100 grams, at 120° C. The mixture was then cured for 20 hours at 120° C.

A bar of a cured resin thus produced was then subjected to a stress of 1,500 pounds per square inch while the temperature was raised one degree per minute by an oil bath. This bar, subjected to the increasing heat, while maintained under stress of 1,500 pounds per square inch, resisted distortion until the temperature reached 138° C.

A bar of a cured resin prepared from 70 parts of Epon 834 and 30 parts of phthalic anhydride, by the curing of the mixture for 20 hours at 120° C., exhibited heat distortion when subjected to 1,500 pounds stress per square inch at a temperature of 113° C.

TEST METHOD

Heat distortion figures were determined by the following method. A sample bar of the cured resin, 2.25" x 0.5" x 0.25", is supported in a mineral oil bath by cylindrical rods 5/32" in diameter spaced 2 inches apart on centers. A stress of 1,500 pounds per square inch is applied across the entire width of the sample, at its center, by a cylindrical bearing 5/32" in diameter. The temperature of the oil bath is raised exactly one degree per minute while total deflection of the sample is measured at half-minute intervals by a micrometer. The rate of deflection during each interval is calculated in 0.001" per minute and plotted against the average temperature of that interval. This gives a curve which is nearly horizontal before, and nearly vertical at, the softening point. The temperature shown by the point at which tangents to these two portions of the curve intersect is considered to be the temperature at which heat distortion occurs. A series of compositions of varying ratios of glycidyl ether to anhydrided was run for each system described and compositions given are the ones that give maximum resistance to heat distortion, as determined by graphing the individual determinations for each system.

Example 3

6.8 parts by weight of the 1,2,3,4,5,6,6a,7,8,9,10,11,12,12a - tetradecahydrochrysene-5,6,11,12-tetracarboxylic acid dianhydride, the product of Example 1, were dissolved in 33.2 parts of molten phthalic anhydride at a temperature of 170° C. and thoroughly mixed with 60 parts of Epon 834 previously heated to 130° C. To this mixture there was then added one part of p,p',p"-methylidynetris(N,N-dimethylaniline), after which the mass was then cured for 20 hours at 120° C.

A bar made from the resin thus produced was then subjected to a stress of 1,500 pounds per square inch and the temperature elevated in accordance with the test method above described. By this test the bar failed to show heat distortion until the temperature thereof had reached 140° C.

Example 4

A cured resin was prepared in accordance with the general method described in Example 2, except that maleic anhydride was used in the place of the phthalic anhydride of Example 2. When tested in accordance with the test method above described the bar failed to show heat distortion until the temperature thereof had reached 125° C., this maximum resistance being achieved when the ratio of Epon 834:maleic anhydride; the dianhydride was 36.4:11.0:2.6.

A bar of cured resin prepared from 77 parts of Epon 834 and 23 parts of maleic anhydride, by the curing thereof for 20 hours at 120° C., gave the optimum resistance to heat distortion in a resin produced from those ingredients alone. That bar, when tested in accordance with the test method above described, failed to show heat distortion until the temperature thereof had reached 119° C.

The uniqueness of the novel dianhydride, the product of Example 1, is especially noteworthy. That dianhydride, we discovered, possesses the unexpected property of being sufficiently compatible with phthalic anhydride and maleic anhydride to permit its addition to epoxy resins as cross-linking agent when dissolved in either of those curing agents. We have found that other dianhydrides, such as butane 1,2,3,4-tetracarboxylic dianhydride and the dianhydride formed by the Diels-Alder reaction between 2-pyrone-5-carboxylic acid and maleic anhydride, exhibit markedly less compatibility. Indeed, the compatibility of the last mentioned dianhydrides with phthalic anhydride and maleic anhydride is so low that it is impossible to add any significant amount thereof to the resin.

In the course of our investigation which led to the present invention we found that a maximum of one part of the dianhydride, the product of Example 1, is soluble in 4 parts of either molten phthalic anhydride or molten maleic anhydride.

The improvement in resistance to heat distortion which is effectuated by the novel dianhydride of Example 1 is due, we believe, to the fact that it gives increased cross linking density in the cured resin because of its increased functionality. Mono-anhydrides, such as phthalic or maleic anhydrides, are di-functional, i. e., on opening of the anhydride ring they form two reactive groups whereas the dianhydride, on the contrary, provides four reactive groups.

The novel dianhydride of Example 1 may be used to effectuate cross-linking of the following types of epoxides or mixtures thereof:

(1) Glycidyl ethers derived from epichlorohydrin and polyhydric aromatic compounds
(2) Glycidyl ethers derived from epichlorohydrin and polyhydric aliphatic alcohols
(3) Other polyepoxy compounds.

The following are illustrative of the polyhydric aromatic compounds that form the ethers of group 1, supra:

Bisphenol-A
Catechol
Resorcinol
Hydroquinone
Phloroglucinol
1,5-dihydroxynaphthalene
4,4'-dihydroxybiphenyl
4,4'-dihydroxydiphenyl sulfone
4,4'-dihydroxydiphenyl methane
Tris (4-hydroxyphenyl)methane
2,2,3,3-tetrakis(4'-hydroxyphenyl)butane
1,4,9,10-tetrahydroxyanthracene
1,2,4-trihydroxyanthraquinone
2,2,4,4-tetrakis(4'-hydroxyphenyl)pentane
2,2,5,5-tetrakis(4'-hydroxyphenyl) hexane, etc.

The following are illustrative of the polyhydric aliphatic alcohols that form the ethers of group 2, supra:

Ethylene glycol
Polyethylene glycol
Glycerol
Pentaerythritol
Sorbitol, etc.

The following are illustrative of the polyepoxy compounds of group 3, supra:

Vinyl cyclohexene diepoxide
Butylenediepoxide
The diepoxide of diethylene glycol bis-exodihydrodicyclopentadienyl ether, etc.

The foregoing mixtures may be made by mixing the components of the mixture. Alternatively, in the case of a mixture of the glycidyl ethers of the polyhydric aromatic compounds, by reacting epichlorohydrin with a mixture of the parent polyhydric aromatic compounds.

The preparation of the glycidyl ethers of 2,2,4,4-tetrakis(4'-hydroxyphenyl) pentane and 2,2,5,5-tetrakis-(4'-hydroxyphenyl)hexane and of those parent polyhydric aromatic compounds themselves is described in our co-pending application, Serial Number 371,419, filed July 30, 1953, as follows:

PREPARATION 1.—2,2,4,4-TETRAKIS(4'-HYDROXYPHENYL)PENTANE 564 grams (6 moles) of phenol and 18.4 grams of thioglycolic acid [0.2 mol per mol of the subsequently used ketone] in 10 ml. of 37 percent hydrochloric acid were placed in a 1-liter, 3-necked flask equipped with a condenser, mercury seal stirrer, thermometer, dropping funnel and a tube extending to the bottom of the flask.

The flask contents were heated to 55° C. and saturated with hydrogen chloride [generated by dropping concentrated sulfuric acid onto dry sodium chloride], the hydrogen chloride being introduced into the flask through the tube. Then 100 grams (1 mol) of 2,4-pentanedione-(acetylacetone) were added dropwise through the dropping funnel with continuous stirring during one hour at 59°–61° C. The reaction was slightly exothermic. During the addition of the ketone, a continuous rapid stream of hydrogen chloride was passed through the solution. This was continued for an additional 20 minutes at 60° C. and also while the flask was cooled by an ice bath to 30° C. The flask was then sealed and allowed to stand at 30° C. After four days the contents had become a nearly solid mass of reddish crystals. The product was purified by washing four times with cold water, three times with 5 percent sodium carbonate solution and six times with hot water. After drying at 85° C. it was a light pink crystalline solid, suitable for use without further purification. The yield was 309 grams, 70 percent of theoretical. After two recrystallizations from ethyl acetate and toluene, the product was a pink crystalline solid which melted at 248°–249° C. uncorrected.

PREPARATION 2.—2,2,4,4-TETRAKIS(4'-GLYCIDYL-OXYPHENYL)PENTANE 220 grams (0.5 mol) of 2,2,4,4-tetrakis(4'-hydroxyphenyl)pentane, the product of Preparation 1, and 740 grams (8 mols) of epichlorohydrin were mixed and heated to 55° C. in a 3-necked, round-bottomed flask equipped with a reflux condenser, thermometer, dropping funnel, and a high-speed stirrer. Then, 168 grams (3 mols) of potassium hydroxide, as a 30 percent aqueous solution, were added dropwise with constant stirring during 70 minutes. While the alkali was being added, and for an additional 30 minutes, the temperature was maintained at 68°–73° C. by the occasional use of an ice bath and, near the end of the reaction, an oil bath. The reaction mixture was then washed with water until free of alkali. Volatile materials were removed from the product by vacuum distillation (from 40 mm. to 2 mm., mercury gauge).

The ether was obtained as a light brown, moderately viscous liquid having an average of 0.52 epoxide group per hundred grams. The yield was 260 grams, 78 percent of theoretical. The foregoing comments on the fact that the product is probably the slightly polymerized ether apply here.

PREPARATION 3

A glycidyl ether of 2,2,4,4-tetrakis(4'-hydroxyphenyl)-pentane was prepared as described in Preparation 2 except that 370 grams (4 mols) of epichlorohydrin were used, i. e., twice rather than four times the stoichiometric amount. The product was a liquid which is slightly more viscous than that obtained in Preparation 2 because of a slight increase in the degree of polymerization. It had an average of 0.48 epoxide group per hundred grams. The yield was 472 grams, 71 percent of theoretical.

PREPARATION 4.—2,2,5,5-TETRAKIS(4'-HYDROXY-PHENYL)HEXANE

This product was manufactured by the above described method (Preparation 1) for the manufacture of pentane analogue, except that 114 grams (1 mol) of 2,5-hexanedione (acetonylacetone) were used in the place of the corresponding pentanedione.

The crude product was purified as follows: after the reactants had formed a nearly solid mass of crystals, all adhering liquid was removed by suction filtration through glass wool. The crystals were then washed three times with cold 95 percent ethanol and dried in an oven at 85° C. The product was a white, crystalline solid which melted with partial decomposition at 292°–295° C. (uncorrected). The yield was 189 grams, 42 percent of theoretical.

PREPARATION 5.—2,2,5,5-TETRAKIS(4'-GLYCIDYLOXY-PHENYL)HEXANE

The above ether was prepared in the manner described in Preparation 2 for the preparation of the pentane analogue. There was used as the starting material, 2,2,5,5-tetrakis(4'-hydroxyphenyl)hexane, the product of Preparation 4, in the amount of 227 grams (0.5 mol).

This ether was obtained as a light brown amorphous solid which softened at 30°–48° C. It had an average of 0.51 epoxide group per hundred grams. The yield was 228 grams, 67 percent of theoretical.

PREPARATION 6

A second ether of 2,2,5,5-tetrakis(4'-hydroxyphenyl)hexane was prepared in accordance with the general procedure described above, except that 555 grams (6 mols) of epichlorohydrin was used [3 rather than 4 times the stoichiometric amount], and 80 grams (2 mols) of sodium hydroxide [the stoichiometric amount of sodium hydroxide rather than 1.5 times the stoichiometric amount of potassium hydroxide] were used.

The product thus obtained was a pale yellow amorphous solid which softened at 70°–90° C. It had an average of 0.29 epoxide group per 100 grams. The yield was 275 grams, 80 percent of theoretical.

PREPARATION 7.—A MIXED GLYCIDYL ETHER 91.3 grams (0.4 mol) of 2,2-bis(4'-hydroxyphenyl)-propane [Bisphenol-A] and 176 grams (0.4 mol) of 2,2,4,4-tetrakis(4'-hydroxyphenyl)pentane, the product of Preparation 1, were used as the starting material and reacted with 888 grams (9.6 mols) of epichlorohydrin, as described in Preparation 2, in the presence of 179.5 grams of potassium hydroxide. There was obtained by this reaction a mixed polyglycidyl ether. This product was a somewhat less viscous liquid then the product obtained in Preparation 2 and had an average of 0.49 epoxide group per hundred grams. The yield was 325 grams, 81 percent of theoretical.

1,2,3,4,5,6,6a,7,8,9,10,11,12,12a - tetradecahydrochrysene-5,6,11,12-tetracarboxylic acid dianhydride has the following structural formula:

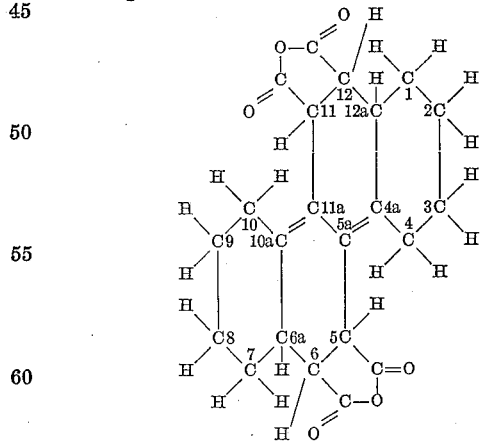

It will be understood that the foregoing description of the invention, and the examples set forth, are merely illustrative of the principles thereof. Accordingly, the appended claims are to be construed as defining the invention within the full spirit and scope thereof.

We claim:
1. As novel products the resins resulting from the heat curing of (1) polyglycidyl ethers of polyhydric compounds of the class consisting of polyhydric phenols and polyhydric aliphatic alcohols with (2) a dicarboxylic acid anhydride of the class consisting of maleic and phthalic anhydrides and (3) a small amount of 1,2,3,4,5,6,6a,7,

8,9,10,11,12,12a-tetradecahydrochrysene-5,6,11,12 - tetracarboxylic acid dianhydride.

2. Resins in accordance with claim 1 including p,p',p''-methylidynetris-(N,N-dimethylaniline).

3. A novel resin resulting from the heat curing of (1) a glycidyl ether of a polyhydric phenol with (2) a dicarboxylic acid anhydride of the class consisting of maleic and phthalic anhydrides and (3) a small amount of 1,2,3,4,5,6,6a,7,8,9,10,11,12,12a - tetradecahydrochrysene-5,6,11,12-tetracarboxylic acid dianhydride.

4. A novel resin resulting from the heat curing of (1) a glycidyl ether of 2,2-bis(4'-hydroxyphenyl)propane with (2) a dicarboxylic acid anhydride of the class consisting of maleic and phthalic anhydrides and (3) a small amount of 1,2,3,4,5,6,6a,7,8,9,10,11,12,12a-tetradecahydrochrysene-5,6,11,12-tetracarboxylic acid dianhydride.

5. A novel resin in accordance with claim 4 including p,p'p''-methylidynetris-(N,N-dimethylaniline) as an accelerator for the curing.

6. Resins in accordance with claim 1 wherein the polygylcidyl ethers are glycidyl ethers of polyhydric aliphatic alcohols.

References Cited in the file of this patent

UNITED STATES PATENTS 2,329,979    Butz  ---------------- Sept. 21, 1943